(12) United States Patent
Ha et al.

(10) Patent No.: US 7,851,081 B2
(45) Date of Patent: Dec. 14, 2010

(54) EQUAL DISTRIBUTION-TYPED BUS BAR, AND MIDDLE OR LARGE-SIZED BATTERY PACK EMPLOYED WITH THE SAME

(75) Inventors: Jin Woong Ha, Daejeon (KR); Dalhoon Lee, Daejeon (KR); Jeeho Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 12/440,801

(22) PCT Filed: Sep. 6, 2007

(86) PCT No.: PCT/KR2007/004293

§ 371 (c)(1),
(2), (4) Date: Apr. 23, 2010

(87) PCT Pub. No.: WO2008/035874

PCT Pub. Date: Mar. 27, 2008

(65) Prior Publication Data

US 2010/0248009 A1    Sep. 30, 2010

(30) Foreign Application Priority Data

Sep. 18, 2006    (KR) .................. 10-2006-0089900

(51) Int. Cl.
*H01M 2/24* (2006.01)
(52) U.S. Cl. .................. 429/160; 429/158; 429/123

(58) Field of Classification Search .................. 429/160, 429/158, 7, 123, 121, 149; 439/754
See application file for complete search history.

(56) References Cited

U.S. PATENT DOCUMENTS

| 5,643,693 | A |   | 7/1997 | Hill et al. |
| 5,662,497 | A | * | 9/1997 | Reilly ........................ 439/627 |
| 6,146,788 | A |   | 11/2000 | Ikeda et al. |
| 6,771,045 | B1 |  | 8/2004 | Keller |

FOREIGN PATENT DOCUMENTS

JP    2003-346772    12/2003

OTHER PUBLICATIONS

International Search Report, PCT/KR2007/004293.

* cited by examiner

*Primary Examiner*—Raymond Alejandro
(74) *Attorney, Agent, or Firm*—Lerner, David, Littenberg, Krumholz & Mentlik, LLP

(57) ABSTRACT

Disclosed herein are a bus bar for connecting two or more devices to an external circuit, wherein the bus bar is capable of equalizing internal resistances between a connection point of the external circuit and connection points of the respective devices, and a middle- or large-sized battery pack including the same. The bus bar according to the present invention reduces the difference of internal resistances due to a circuit to allow a battery module having optimized performance and a middle- or large-sized battery pack including the same to be manufactured.

8 Claims, 3 Drawing Sheets

100

120
110

EQUAL DISTRIBUTION-TYPED BUS BAR, AND MIDDLE OR LARGE-SIZED BATTERY PACK EMPLOYED WITH THE SAME

CROSS REFERENCE TO RELATED APPLICATIONS

The present application is a national phase entry under 35 U.S.C. §371 of International Application No. PCT/KR2007/004293, filed Sep. 6, 2007, published in English, which claims the benefit of Korean Patent Application No. 10-2006-0089900, filed Sep. 18, 2006. The disclosures of said applications are incorporated by reference herein.

FIELD OF THE INVENTION

The present invention relates to an equal distribution type bus bar, and, more particularly, to a bus bar for connecting two or more devices to an external circuit, wherein the bus bar is capable of equalizing internal resistances between a connection point of the external circuit and connection points of the respective devices, and a middle- or large-sized battery pack including the same.

BACKGROUND OF THE INVENTION

Recently, a secondary battery, which can be charged and discharged, has been widely used as an energy source for wireless mobile devices. Also, the secondary battery has attracted considerable attention as an energy source for electric vehicles and hybrid electric vehicles, which have been developed to solve problems, such as air pollution, caused by existing gasoline and diesel vehicles using fossil fuel.

Small-sized mobile devices use one or several battery cells for each device. On the other hand, middle- or large-sized devices, such as vehicles, use a middle- or large-sized battery pack having a plurality of unit cells electrically connected with each other because high output and large capacity are necessary for the middle- or large-sized devices.

The middle- or large-sized battery pack, which is used as a charging and discharging power source for electric vehicles and hybrid electric vehicles, is manufactured by electrically connecting a plurality of battery modules in series/parallel with each other and mechanically coupling the battery modules to each other. Consequently, the electrical connection between the battery modules is carried out by various kinds of bus bars, such as wires, nickel plates, printed circuit boards (PCB), and flexible printed circuit boards (flexible-PCB).

However, the distances between the connection point of an external circuit and connection points of the battery modules are different from each other due to the structural characteristics of the battery pack including the battery modules connected to each other. Specifically, the difference of internal resistances occurs at the respective battery module connection points due to the difference in length of bus bars connected between the external circuit connection point and the respective battery module connection points, with the result that, when high-voltage current flows, during the charging process and/or the discharging process, the current difference between the respective battery modules occurs.

A middle- or large-sized battery pack for electric vehicles is required to operate for a long period of time, and high-temperature, high-voltage current flows in the middle- or large-sized battery pack. As a result, the difference of the operating conditions, caused due to the small difference of the internal resistance, facilitates the degradation of some battery modules (specifically, the degradation of battery cells constituting the respective battery modules), whereby the overall life span of the battery pack is reduced.

Consequently, some researches have been carried out to solve the above-described problems. For example, Japanese Patent Application Publication No. 2003-346772 discloses circuits ('connection circuits') connected between cathode and anode plates of a battery cell and electrode plate connection parts, wherein the connection circuits are constructed in a structure in which the lengths or thicknesses of the connection circuits are changed depending upon the distances between the respective connection circuits such that the connection circuits have the same internal resistance.

In the method of changing the lengths or thicknesses of the connection circuits to equalize the internal resistances, however, the sectional area of the connection circuits is calculated based on the lengths of the connection circuits to design the connection circuits such that the respective connection circuits have corresponding shapes (lengths or thicknesses). As a result, the connection circuits have complicated shapes, and therefore, it is difficult to manufacture the connection circuits, and, in addition, the manufacturing costs of the connection circuits are increased.

Also, during the construction of the middle- or large-sized battery pack, it is required to manufacture different connection circuits which are precisely calculated such that the internal resistances are equalized depending upon the positional change of the battery modules. Furthermore, the internal resistances of the circuits are changed by the temperature. Consequently, the internal resistances of the connection circuits, the lengths or thicknesses of which are previously set as described above, may be changed depending upon the change of the temperature under an actual operating condition, the accurate estimate of which is actually limited to construct the connection circuits. Also, the change in shape of the connection circuits due to the change in design frequently occurs, and therefore, the extensionability and flexibility of the connection circuits are greatly lowered.

Consequently, there is a high necessity for a technology that is capable of fundamentally solving the above-mentioned several problems.

SUMMARY OF THE INVENTION

Therefore, the present invention has been made to solve the above problems, and other technical problems that have yet to be resolved.

Specifically, it is an object of the present invention to provide a bus bar that is capable of reducing the difference of internal resistances due to a conducting wire or a circuit to allow a battery module having optimized performance and a middle- or large-sized battery pack including the same to be manufactured.

In accordance with one aspect of the present invention, the above and other objects can be accomplished by the provision of a bus bar for connecting two or more devices to an external circuit, the bus bar including a connection circuit connected to a connection point of the external circuit, and a plurality of distribution circuits having the same length from the end of the connection circuit to connection points of the respective devices, thereby equalizing internal resistances between the connection point of the external circuit and the connection points of the respective devices.

Generally, the bus bar is a connecting member used to perform the electrical connection between devices. A nickel plate, a printed circuit board (PCB), or a flexible printed circuit board (flexible-PCB) may be used as the bus bar.

When a plurality of devices are interconnected using the conventional bus bars to construct a connection circuit, however, the connection distances between the connection point of the external circuit and the respective connection points of the devices are different from each other, as previously described. As a result, the difference of internal resistances occurs due to the different lengths of the bus bars, and therefore, a minute current difference occurs between the devices.

In the bus bar according to the present invention, on the other hand, the distribution circuits, for connection between the connection point of the external circuit and the connection points of the respective devices, have the same length. Consequently, the internal resistances between the connection point of the external circuit and the connection points of the respective devices are uniform, and therefore, the current difference does not occur.

In a preferred embodiment based on the above-described structure, the bus bar further includes a conductive connecting member mounted at one end of the connection circuit, and the distribution circuits are wires, having the same length, connected to the conductive connecting member. Consequently, the respective devices are connected to the connection point of the external circuit, via the wires having the same length, irrespective of the distance between the respective devices and the connection point of the external circuit, and therefore, the connection circuits exhibit uniform internal resistance.

Preferably, the respective wires are covered and/or coated with an insulative material for insulation from the outside. Since the lengths of the respective wires are the same, the wires connected to the devices relatively close to the connection point of the external circuit are bent, with the result that a short circuit may occur. Covering and/or coating the respective wires with the insulative material prevents the occurrence of such a short circuit.

The structure of the connecting member is not particularly restricted so long as the connecting member is made of a material having a specific conductivity. Preferably, the conductive connecting member is a plate having a small thickness, and the conductive connecting member is constructed in a structure in which the conductive connecting member has a collection point connected to the connection point of the external circuit and at least one distribution point connected to the respective distribution circuits at the same distance from the collecting point.

More preferably, the conductive connecting member is a plate formed in the shape of a sector, and the conductive connecting member is constructed in a structure in which the distribution points are formed at an arc such that the distribution points are arranged at regular intervals, and the collection point is located at the center of the arc at the same distance from the distribution points. When the collection point of the sector-shaped plate is located at the center of the arc, the distribution points at the arc are located such that the distribution points are spaced, by a distance approximately corresponding to the radius of the arc, from the collection point. Consequently, the respective distribution points are spaced the same distance from the collection point.

In a preferred embodiment, the collection point and the distribution points are through-holes formed through the conductive connecting plate. Consequently, the electrical connection using the wires is easily performed. For example, a welding or soldering process may be performed while the wires are inserted through the through-holes. Alternatively, the wires may be provided at one end thereof with through-holes corresponding to the through-holes of the conductive connecting member, and then the electrical connection between the wires and the conductive connecting member may be accomplished by inserting bolts through the through-holes of the wires and the through-holes of the conductive connecting member.

The kinds of the devices are not particularly restricted so long as the electrical connection between the devices is required. Preferably, each device is a battery cell that can be charged and discharged or a battery module including a plurality of battery cells. Consequently, it is possible to manufacture a middle- or large-sized battery pack including a plurality of battery modules connected in series and/or parallel with each other using the bus bar according to the present invention.

In accordance with another aspect of the present invention, there is provided a middle- or large-sized battery pack constructed in a structure in which the electrical connection of the battery pack is performed using the bus bar.

The middle- or large-sized battery pack according to the present invention may be used as a power source for vehicles, such as electric bicycles (e-bikes), electric motorcycles, electric vehicles, or hybrid electric vehicles, or as a power source for various applications and products, including industrial or domestic apparatuses. Preferably, the middle- or large-sized battery pack is used as a charging and discharging power source for electric vehicles.

In the middle- or large-sized battery pack according to the present invention, the electrical connection between battery modules is accomplished using the equal distribution type bus bar. Consequently, the current difference does not occur between the battery modules even under a large current condition, and therefore, the degradation of specific battery modules or the secondary battery cells in the specific battery modules is prevented during the long-term use of the middle- or large-sized battery pack.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
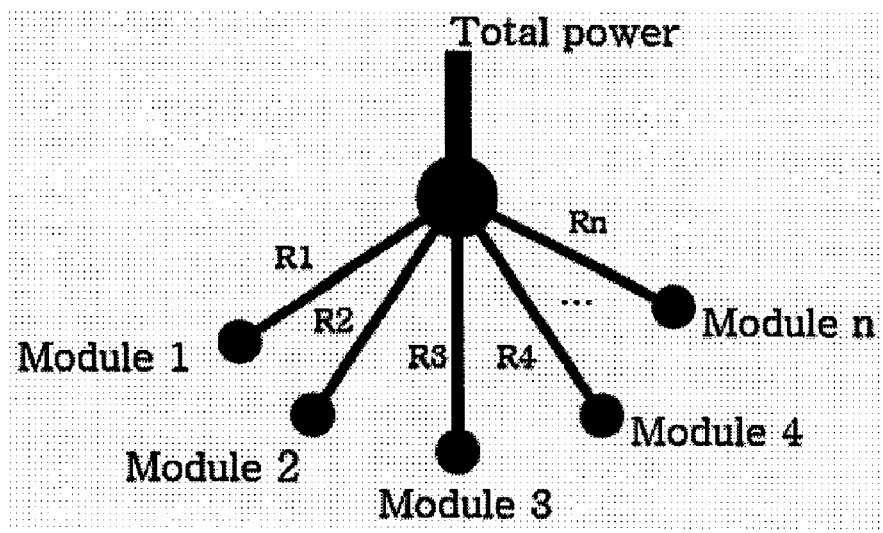
FIG. 1 is a conceptional view illustrating the structure of an equal distribution type bus bar.

FIG. 1 is a conceptional view illustrating the structure of an equal distribution type bus bar according to the present invention. Referring to FIG. 1, when battery modules, as devices, are electrically connected in parallel with each other using the bus bar, the respective battery modules are connected to a connection point of an external circuit via distribution circuits R1, R2, R3 . . . Rn having the same length, with the result that the distribution circuits assigned to the respective battery modules have the equal internal resistance irrespective of the position of the connection point of the external circuit.

Figure 2:
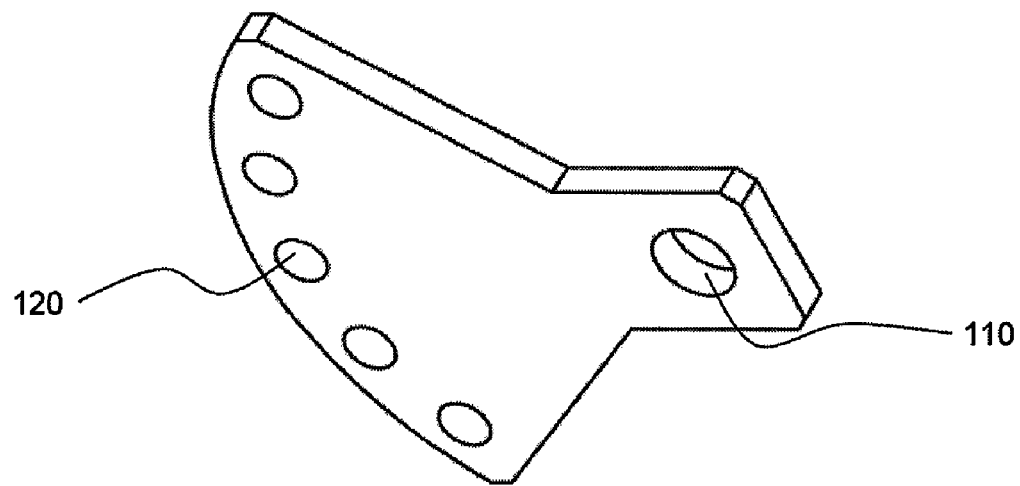
FIG. 2 is a typical view illustrating a conductive connecting member according to a preferred embodiment of the present invention.

FIG. 2 is a typical view illustrating a conductive connecting member that is used in the bus bar according to the preferred embodiment of the present invention.

Referring to FIG. 2, the conductive connecting member 100 is a plate formed approximately in the shape of a sector. Specifically, the conductive connecting member 100 is constructed in a structure in which a collection point 110 is formed at the center of an arc, and a plurality of distribution points 120 are formed at the arc such that the distribution points 120 are arranged at regular intervals. The collection point 110 and the distribution points 120 are formed in the shape of a through-hole. Cables or wires (not shown) having the same length may be coupled to the through-holes by mechanical coupling using bolts/nuts, welding, or soldering.

Figure 3:
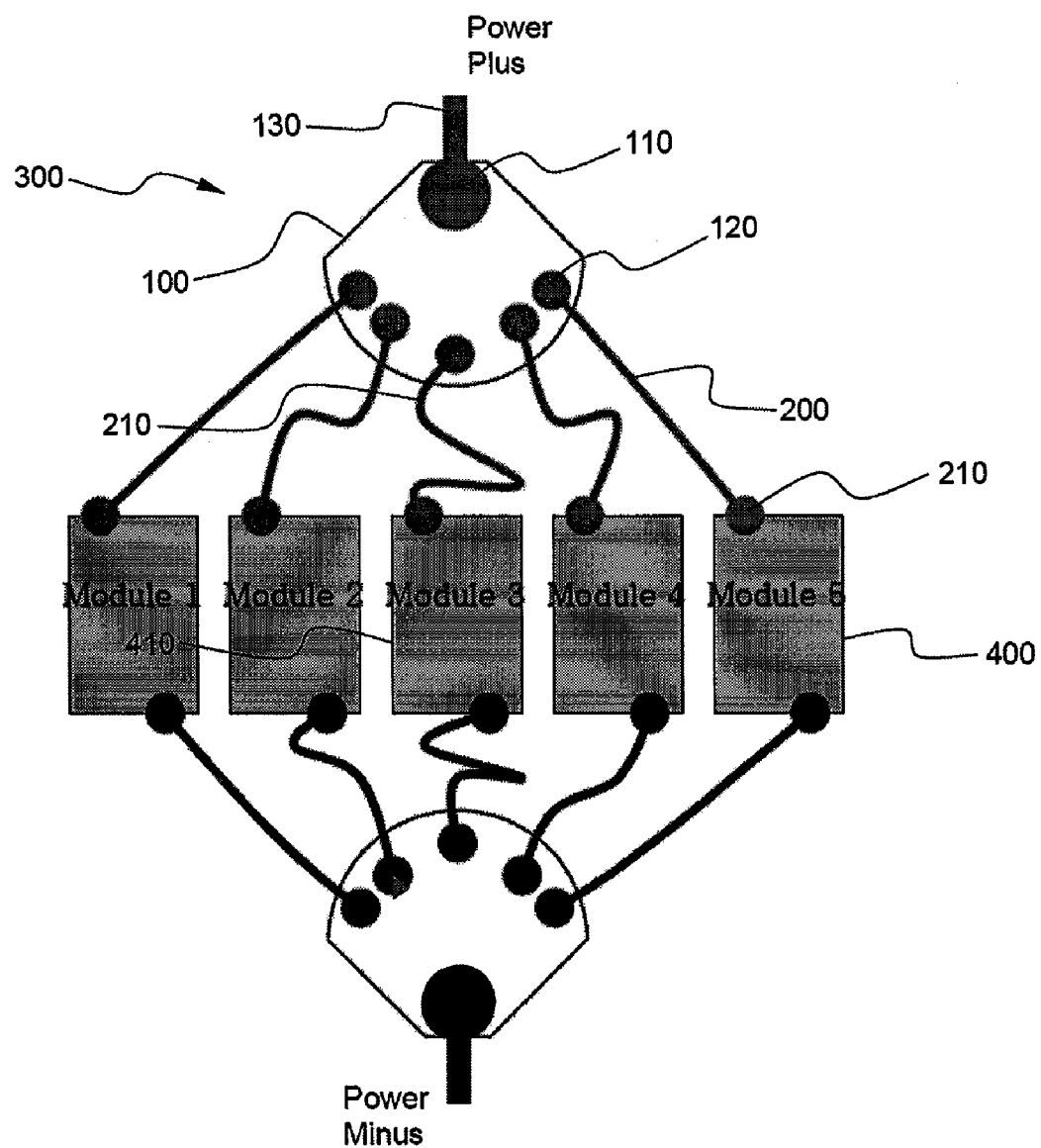
FIG. 3 is a typical view illustrating the connection between an equal distribution type bus bar, to which the conductive connecting member of FIG. 2 is applied, and battery modules.

FIG. 3 is a typical view illustrating the connection between an equal distribution type bus bar, to which the conductive connecting member of FIG. 2 is applied, and battery modules.

Referring to FIG. 3, the bus bar 300 according to the present invention includes a conductive connecting member 100 having the structure as previously described with reference to FIG. 2, and a plurality of cables 200, having the same length, connected to the conductive connecting member 100. The bus bar 300 electrically connects a plurality of battery modules 400 in parallel with each other to provide a large-capacity battery pack.

Specifically, the distribution points 120 formed at the conductive connecting member of the bus bar are electrically connected to connection points of the respective battery modules 400 via the cables 200. The respective cables 200 have the same length such that the internal resistance difference between the cables 200 does not occur. Also, the respective cables 200 are coated with an insulative material for insulation from the outside. Since the lengths of the respective cables are the same, the cables 210 connected to the battery modules 410 relatively close to the conductive connecting member 100 are bent. Cathodes and anodes of the battery modules are connected to the distribution points 120 of the conductive connecting member 100 via the cables 200. Electric current, reaching to the distribution points 120 of the conductive connecting member 100, are collected at the collection point 110 of the conductive connecting member 100.

Consequently, the connection circuits of the battery modules to the connection point 110 of the external circuit 130 exhibit the same internal resistance irrespective of the positions of the battery modules 400 and 410, and therefore, the current difference does not occur even under a large current condition.

Figure 4:
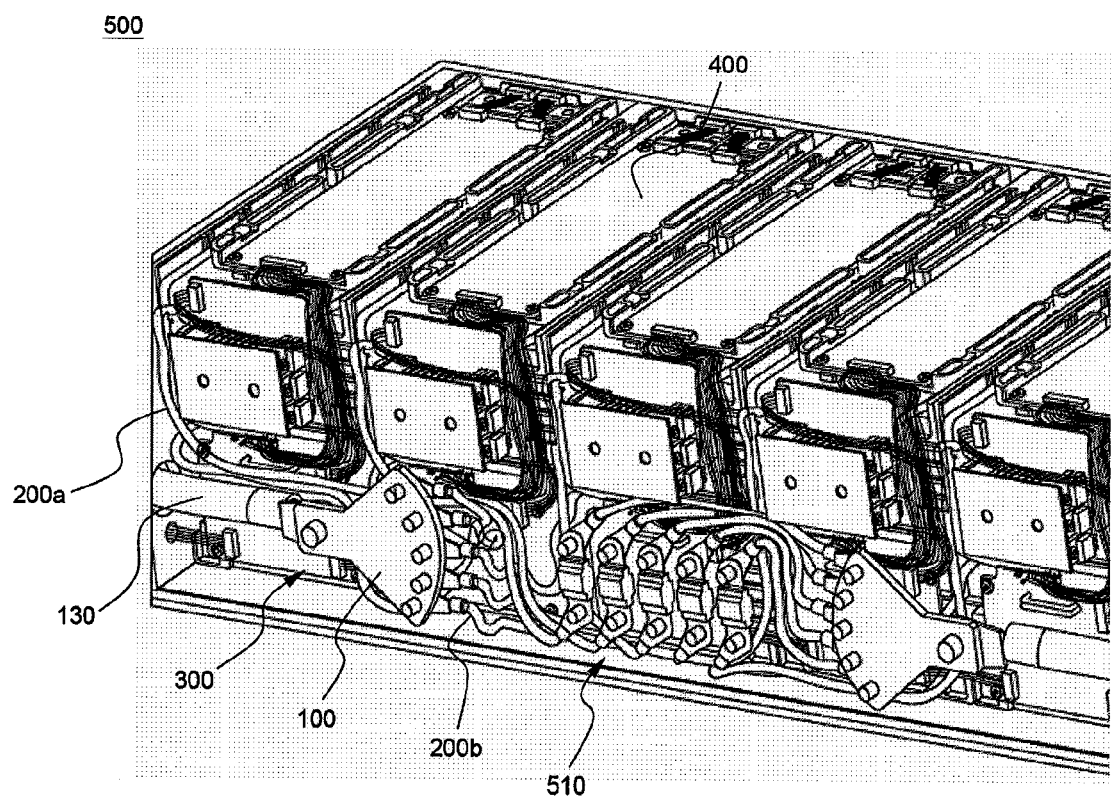
FIG. 4 is a partial perspective view illustrating a middle- or large-sized battery pack including the bus bar connection structure of FIG. 3.

FIG. 4 is a partial perspective view illustrating the structure of a middle- or large-sized battery pack constructed by connecting a plurality of battery modules using the bus bar of FIG. 3.

Referring to FIG. 4, the middle- or large-sized battery pack 500 includes a plurality of battery modules 400, each of which includes a plurality of secondary battery cells as unit cells. The respective battery modules 400 are connected with each other via the bus bar 300 such that the battery modules 400 are connected to an external circuit 130. Specifically, electrode terminals of the respective battery modules 400 are connected to a common connector 510 via first cables 200a having the same length, and the bus bar 300 is mounted between the common connector 510 and the external circuit 130. Alternatively, the battery modules 400 may be directly connected to the bus bar 300 not via the common connector 510.

The conductive connecting member 100 of the bus bar 300 is also connected to the common connector 510 via second cables 200b having the same length. Consequently, the respective battery modules 400 do not exhibit an internal resistance difference when the respective battery modules 400 are electrically connected to the external circuit 130.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the current difference does not occur in the bus bar according to the present invention, even when high current flows in the bus bar during several electrical connections, by virtue of uniform internal resistance. Consequently, the degradation of battery modules or battery cells constituting the battery modules is prevented, with the result that the overall life span of the battery pack is increased, and the uniform charging and discharging efficiency of the battery modules or the battery cells is acquired.

What is claimed is:

1. A bus bar for connecting two or more devices to an external circuit, the bus bar comprising:
    a connection circuit connected to a connection point of the external circuit; and
    a plurality of distribution circuits having the same length from the end of the connection circuit to connection points of the respective devices, thereby
    equalizing internal resistances between the connection point of the external circuit and the connection points of the respective devices.

2. The bus bar according to claim 1, further comprising:
    a conductive connecting member mounted at the end of the connection circuit, wherein the distribution circuits are wires, having the same length, connected to the conductive connecting member.

3. The bus bar according to claim 2, wherein
    the conductive connecting member is a plate having a small thickness, and
    the conductive connecting member has a collection point connected to the connection point of the external circuit and two or more distribution points connected to the respective distribution circuits at the same distance from the collecting point.

4. The bus bar according to claim 3, wherein the conductive connecting member is a plate formed in the shape of a sector, and the conductive connecting member is constructed in a structure in which the distribution points are formed at an arc such that the distribution points are arranged at regular intervals, and the collection point is located at the center of the arc at the same distance from the distribution points.

5. The bus bar according to claim 3, wherein the collection point and the distribution points are through-holes formed through the plate.

6. The bus bar according to claim 1, wherein each device is a battery cell that can be charged and discharged or a battery module including a plurality of battery cells.

7. A middle- or large-sized battery pack constructed in a structure in which the electrical connection of the battery pack is performed using the bus bar according to claim 1.

8. The battery pack according to claim 7, wherein the battery pack is used as a charging and discharging power source for electric vehicles in which high current flows.

* * * * *